(12) United States Patent
Goebels et al.

(10) Patent No.: US 6,371,573 B1
(45) Date of Patent: Apr. 16, 2002

(54) SPECIAL CONTROL MODE FOR ONE-SOLENOID VALVES

(75) Inventors: Hermann J. Goebels, Portage; Richard Erich Beyer, Kalamazoo, both of MI (US)

(73) Assignee: Robert Bosch Corporation, Broadview, IL (US)

(*) Notice: Subject to any disclaimer, the term of this patent is extended or adjusted under 35 U.S.C. 154(b) by 0 days.

(21) Appl. No.: 09/629,001

(22) Filed: Jul. 31, 2000

(51) Int. Cl.[7] .................................................. B60T 8/32
(52) U.S. Cl. ................................. 303/113.1; 303/118.1; 303/156; 303/15.7; 303/158; 303/119.2
(58) Field of Search ........................... 303/113.1, 156, 303/157, 158, 174, 159, 166, 901, 900, DIG. 3, DIG. 4, 162, 117.1, 119.2, 119.1, 116.1–116.4, 61, 68, 69, 113.2, 118.1, 7, 123; 701/78, 71, 80, 82; 251/129.01, 129.22

(56) References Cited

U.S. PATENT DOCUMENTS

| | | | |
|---|---|---|---|
| 3,837,710 A | * | 9/1974 | Reinecke et al. |
| 4,611,859 A | * | 9/1986 | Otsuki et al. ............ 303/116.1 |
| 5,071,200 A | * | 12/1991 | McNinch, Jr. ........... 303/118.1 |
| 6,050,654 A | * | 4/2000 | Gegalski et al. ......... 303/119.2 |
| 6,123,396 A | * | 9/2000 | Siegel ..................... 303/116.1 |

* cited by examiner

Primary Examiner—Douglas C. Butler
(74) Attorney, Agent, or Firm—Leo H McCormick, Jr.; Warren Comstock

(57) ABSTRACT

A braking system for a wheeled vehicle includes a pressurized air source (63), an air actuated wheel braking device (51, 59), an operator control (49, 61) for commanding the supply of air to the braking device, an electronic control (19) which responds to vehicle speed and wheel speed to selectively invoking an antilock mode of braking. A control valve (37, 55) responds to the electronic control (19) and the operator control (49, 61) to selectively control the supply of air from the source to the braking device. In the antilock mode, the control valve is initially enabled to release braking pressure and thereafter alternately enabled and disabled to maintain braking pressure at a substantially constant reduced pressure, and subsequently alternately enabled and disabled at a reduced ratio of enabled duration to disabled duration to rebuild braking pressure.

5 Claims, 2 Drawing Sheets

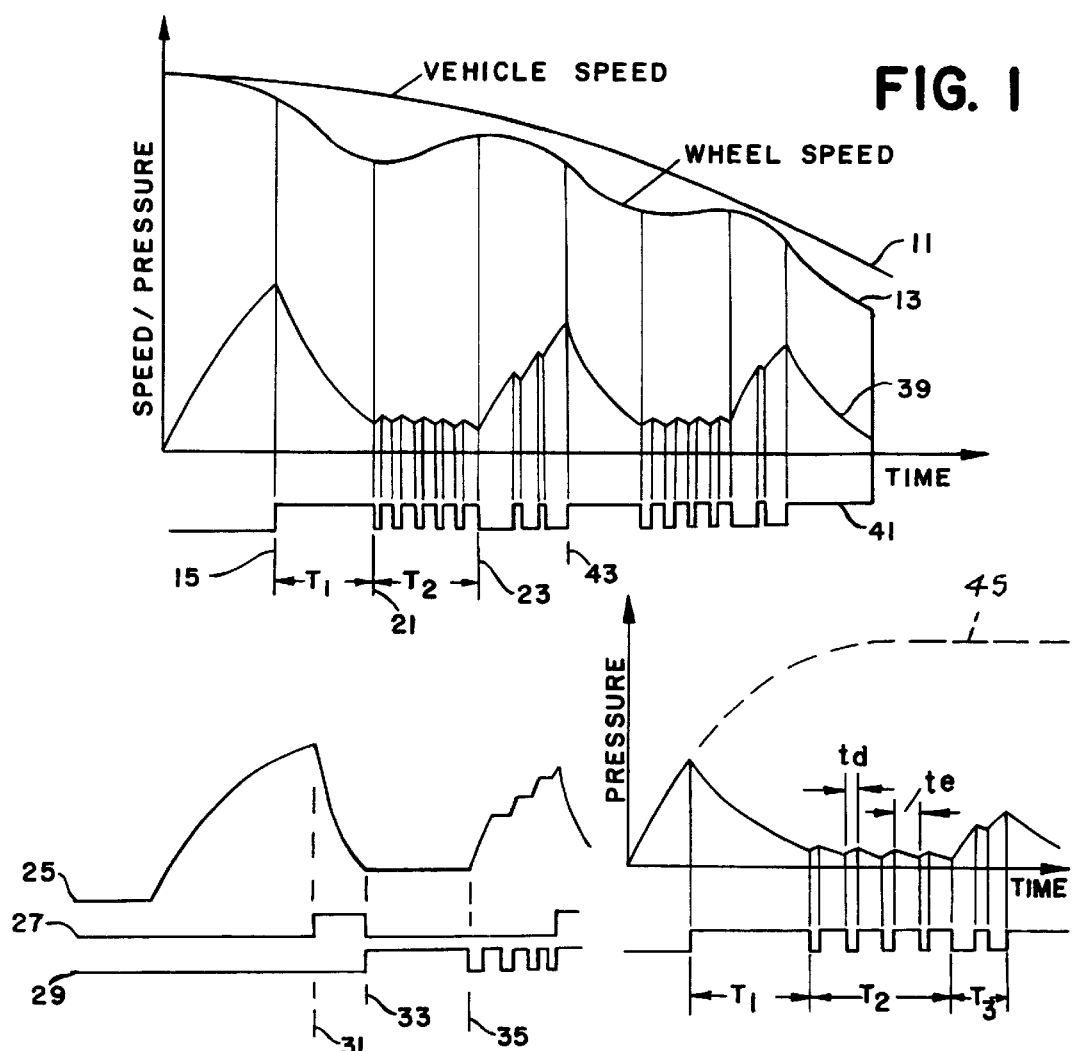
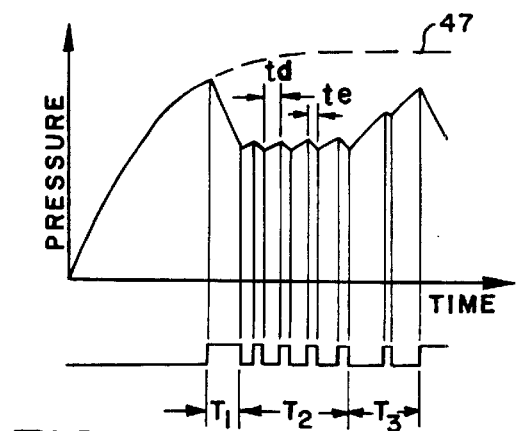
FIG. 2
(PRIOR ART)
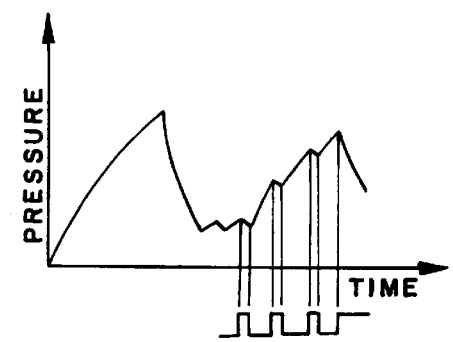
FIG. 4
FIG. 5

SPECIAL CONTROL MODE FOR ONE-SOLENOID VALVES

FIELD OF THE INVENTION

The present invention relates, in general, to control valve equipment and, more particularly, this invention relates to a control mode to operate a valve device for use in an, Antilock Brake (ABS) and/or Traction Control Systems (TCS), for example, of a pneumatically operated vehicle brake system.

BACKGROUND OF THE INVENTION

Both pneumatic and hydraulic braking systems employ a fluid under pressure to apply a braking force to a wheel. Upon detecting an inappropriately low wheel speed during vehicle braking, ABS may be invoked and the fluid pressure reduced. An inappropriately high wheel speed indicative of loss of traction may activate a TCS to apply fluid pressure slowing the slipping wheel and transferring torque to another non-slipping wheel. Many known antilock or anti-skid devices operate by cyclically increasing and decreasing the braking force exerted on the wheels so that a slipping wheel having a tendency to lock is permitted to re-accelerate back to a speed corresponding to the speed of the vehicle. This is typically achieved by control valves alternately allowing fluid to flow out of and then into the brake cylinder, thus lowering and then raising the brake pressure and frequently implemented by two solenoid operated valves, one of which admits fluid to the braking device and the other of which releases fluid from the braking device. The first valve provides either a building up or holding of existing fluid pressure while the other provides a release of the pressure. One-solenoid direct or pilot controlled valve devices for pneumatically operated vehicle braking systems equipped with an antilocking device are known. Especially in the beginning of antilock systems development in middle 1970's, solenoid controlled relay valves were used in connection with complicated internal mechanical logic. Such systems provided a build up and release, but failed to achieve an adequate holding of a specific fluid pressure. Not only the variability of the pressure modulation was limited also the valve device was costly. It would be highly desirable to achieve the hold, build up and release functions with a single relatively inexpensive valve.

Many vehicles employ a differential which provides an application of power to both driving wheels even though one of those driving wheels may be turning faster or moving further than the other as, for example, when the vehicle is turning. If one of the differential coupled wheels is allowed to turn freely as when the tire slips on an icy road surface, no driving power is supplied to the other wheel. In an attempt to obviate this total loss of traction problem, so-called limited slip or positive traction differentials provide a clutch mechanism within the differential housing which, under normal driving conditions, slip allow the outside wheel to turn faster than the inside wheel. Under poor traction conditions, the increased friction provided by the clutches increases the driving torque applied to the wheel with the better traction.

The advent of TCS provided an opportunity to eliminate the weight and cost of these limited slip differentials. In some systems, the addition of a single traction control valve in the brake circuit of the powered wheels allows the anti-skid system to detect when the rotational speed of one driven wheel substantially exceeds that of the other and, despite the absence of any driver commanded braking, provides a braking force to the freely rotating wheel transferring torque back to the wheel with the better traction. Thus, traction control operation is simply a form of anti-skid operation when braking is not being called for.

ABS consists of wheel speed sensors (WSS) an Electronic Control Unit (ECU) and Pressure Modulation Valves (PMV). TCS used the same components as ABS but has an additional valve to apply brake pressure to brake a spinning drive wheel. Each individually controlled wheel requires its own WSS and PMV all electrical connected to one ECU.

The individual wheel speed sensors (WSS) are located at or in the vehicle wheels to sense the instantaneous movement of individual wheels and send an electrical signal to the ECU. The ECU monitors the WSS signals and determines when ABS or TCS intervention is required and actuates the appropriate PMV to optimize the brake pressure. The PMV is controlled electrically by the ECU to decrease, hold or allow building up the applied full brake pressure to prevent excessive wheel slipping or spinning.

For a proper Function of ABS or TCS a three-point pressure control with pressure hold, decrease or built up is necessary. This may be achieved utilizing two solenoid actuated valves or a single valve with two solenoids. If one solenoid is energized by the ECU, the pressure goes in hold position, when both solenoids are energized, the pressure decreases and when no solenoid is energized the pressure builds up. With a different valve design the dual solenoids can be energized one at a time to hold or decrease the pressure.

U.S. Pat. No. 5,660,449 discloses a two valve ABS system where fluid pressure is controlled by a solenoid valve having a variable duty cycle which is changed at predetermined intervals to move the solenoid in a plurality of steps toward a closed position. The two valves provide the conventional ABS mode of operation. U.S. Pat. No. 5,815,362 employs pulse width modulation for controlling an infinitely variable solenoid operated brake cylinder to achieve a pressure regulated feedback. This system is not concerned with ABS nor with achieving a pressure hold or rebuild mode of operation.

Also pressure valves with one solenoid are known. In this case normally only a two-point pressure control is possible: decrease and build up. The function of ABS or TCS with only one-solenoid valves is more or less degraded. The lower cost of an ABS/TCS with one-solenoid valves as compared to a system with two-solenoid valves is highly desirable. It is also highly desirable to achieve the hold function in addition to the decrease and build up using a single one-solenoid valve for each wheel.

SUMMARY OF THE INVENTION

The present invention provides a special control mode to operate a one-solenoid valve that is well suited for use in an antilocking device of pneumatically operated vehicle brake systems. This special control mode is provided by an Electronic Control Unit and allows modulating brake pressure of one or more brake chambers for pressure release, pressure hold and build up. The three-point pressure behavior is the fundamental control mode of the brake chamber pressure in an ABS event and normally achievable only with use of two-solenoid valves. A one-solenoid valve when normally operated provides only a two way pressure behavior with pressure build up if not energized and pressure release if the solenoid is energized. The special control mode of a one-solenoid valve is active in the pressure hold mode and when pressure is built up more slowly than normal. When a pressure hold or a more slowly pressure build up is required the one-solenoid valve is pulsated and intermittently energized to provide small pressure build up and release steps. The frequency and variation of the energizing duty cycles is in consideration of the actual pressure level. Two different one-solenoid valve arrangements are shown for use, for example, in antilock systems of pneumatically operated vehicle brake systems. The special control mode of an one-solenoid valve can be used in other pressure control systems, when a pressure hold function or different pressure build up gradients are required.

In general and in one form of the invention, a process of operating a vehicle braking system in an antilock braking mode includes enabling a single-solenoid valve to release braking pressure and thereafter alternately enabling and disabling the single solenoid valve to maintain a hold of braking pressure at a substantially constant reduced pressure. The solenoid is subsequently alternately enabled and disabled at a reduced ratio of enabled duration to disabled duration to rebuild braking pressure. The ratio of the time during which the valve is enabled to the time during which the valve is disabled is determined, in part, by the time during which the single-solenoid valve was initially enabled to release braking pressure and increases as the time during which the single-solenoid valve was enabled to release braking pressure increases.

With another method the ratio of the alternately enabling and disabling of the single valve is dependent to the respective brake pressure level in the ABS event. The actual pressure level in an ABS event is calculated by the ECU with an ECU internal stored pressure calculation program. The ratio of de-energized to energized time of the one solenoid duty cycles is based on the calculated pressure level in the similar way as the dependence to the release time T1. A lower calculated pressure level is equal to a longer release time T1 and a higher-pressure level is equal to a shorter pressure level T1.

One of the primary objects of the present invention is to provide a three-point pressure behavior with a one-solenoid valve for use with an antilock or traction control system or an electronic brake system for use mainly in pneumatically operated vehicle brake systems. The uses in other compressed air operated systems are also conceivable. A special control mode provided by an ECU is described to get this advantageous three-point pressure behavior with the low cost one-solenoid valve.

Other objects of the present invention include the use of the special control mode in combination with a single solenoid valve, a pilot controlled one-solenoid interrupter valve and with a pilot controlled one-solenoid relay valve.

BRIEF DESCRIPTION OF THE DRAWINGS

The above-mentioned and other features and advantages of this invention, and the manner of attaining them, will become more apparent and the invention will be better understood by reference to the following description of an embodiment of the invention taken in conjunction with the accompanying drawings, wherein:

FIG. 1 is a graph showing the pressure behavior with the special-control-mode-operated one-solenoid valve in conjunction with wheel speed in an ABS event;

FIG. 2 is a graph showing braking pressure behavior of a prior art two-solenoid valve during an ABS event;

FIG. 3 is a graph showing the dependence of the energize phases of the special mode controlled one-solenoid valve to the time of the pressure decrease phase in an event with longer pressure decrease, for example, typical during an ABS event on slippery road;

FIG. 4 is a graph showing the effect with the same dependency of the one-solenoid energize phases on a higher pressure level, for example, during an ABS event on a road with good grip;

FIG. 5 is a graph showing the interrupted pressure built up and pressure release behavior with the one-solenoid PMV;

Figure 6:
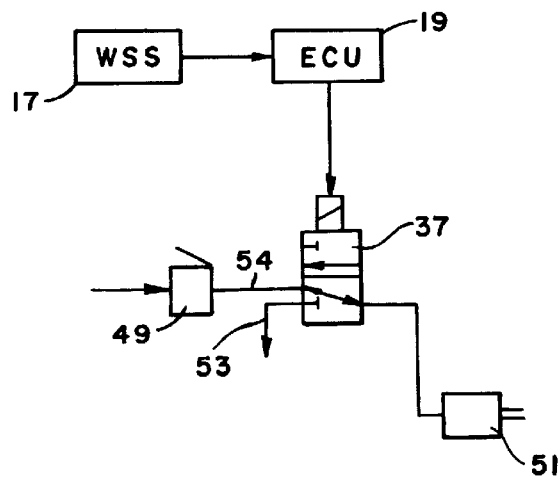
FIG. 6 is a schematic diagram of the basic arrangement of a one-solenoid valve in a pneumatically operated brake system.

Corresponding reference characters indicate corresponding parts throughout the several views. The exemplification's set out herein illustrate one preferred embodiment of the invention, in one form, and such exemplification's are not to be construed as limiting the scope of the invention in any manner.

DETAILED DESCRIPTION OF THE INVENTION

Referring now to FIG. 1 there is illustrated ABS control cycles of an individual controlled wheel during a braking maneuver in an ABS event. The depicted control cycles shows the decreasing vehicle speed, the change of the wheel speed in dependence of the brake pressure modulation and the electrical actuation of the one-solenoid valve, provided by the ECU according to the invention. The vehicle is slowing as illustrated by the curve 11 while the wheel slows along the more erratic curve 13. So long as the two curves coincide, ABS is not invoked. During the time interval before the time indicated at 15, normal build of braking pressure and normal slowing of the wheel is occurring. At the time indicated at point 15, the discrepancy between the actual wheel speed as indicated by the WSS 17 (FIGS. 6 and 7) and a predicted wheel speed determined from the vehicle speed by the ECU 19 (FIGS. 6 and 7) indicates a need for corrective action. A release of fluid pressure is initiated and the rate at which wheel speed decreases diminishes. At the time indicated by point 21, upon sufficient diminution of the rate at which the wheel speed is decreasing as compared to the vehicle speed indication and determined by the ECU, the fluid pressure is held and wheel speed returns toward its proper value. Later, when wheel and vehicle speed indications are sufficiently close, build up and additional braking is initiated at time 23. Thus, in FIG. 1, the time T1 between 15 and 21 is the decay or release portion of the ABS cycle while time interval T2 between 21 and 23 is hold portion.

FIG. 2 shows a typical prior art brake pressure curve 25 in time superimposition with the actuation state curves 27 for a first solenoid and 29 for a second solenoid. As indicated in FIG. 2, the release beginning at time 31 may be caused by actuation of the first solenoid, while the hold beginning at time 33 and subsequent build up beginning at 35 is caused by actuation of the second solenoid. The build up may be intermittent or staggered as illustrated. This fundamental pressure course with release, hold and built up again is typical to control the individual wheel speed in an ABS event and normally achievable only when pressure is controlled with a two-solenoid valve as in FIG. 2.

FIG. 1 shows vehicle speed 11, wheel speed 13, brake pressure 39 and valve actuation 41 for a one-solenoid valve in time superimposition. The valve actuation graph shows the phases of one-solenoid energization for pressure decrease, quasi pressure hold and the interrupted build up steps. The simplified control algorithm of ABS as shown in FIG. 1 is based in principle on the wheel slip (difference between vehicle reference speed and wheel speed) and wheel deceleration and acceleration (change of wheel speed) calculated by the ECU according to the signals of the wheel speed sensors. At time 15, the wheel deceleration has achieved a value that exceeds a certain deceleration threshold and brake pressure modulator valve 37 (FIG. 6) is actuated by the ECU in the pressure release mode. At time 21 the wheel speed deceleration value drops below the threshold and the PMV 37 stops pressure releasing and changes into a pulsation mode to keep the pressure in an approximated hold mode, with alternating periods of pressure release and built up actuation steps. These pulsation steps are created and provided by the ECU by intermittent energizing phases of the one-solenoid PMV 37 according to the invention. By quasi holding the pressure the wheel speed can now accelerate during the time interval T2. At time 23 the deceleration value drops below a threshold and also the wheel slip rate is below a certain threshold and the pressure built up now begins. The built up steps are also intermittent, in dependence on time, and recalculated for each control cycle. Dependent on the pressure drop during time interval T1, and after the quasi pressure hold phase T2, the pressure builds up rapidly first with a longer pulse and followed with smaller pulses until the wheel speed deceleration reaches a certain deceleration threshold at time 43, where curve 13 has the same slope as it had at time 15, and the brake pressure starts release again. The length of the varied built-up pulses is based on the previously learned value of release time T1.

The dependency of the intermittent activation of the one-solenoid PMV 37 according to the invention is explained in FIGS. 3 and 4 for the quasi pressure hold phase (time interval T2, in FIG. 3) and in FIG. 4 the interrupted pressure build up (time interval T3 in FIG. 4). The term 'quasi' is used to differentiate the more or less wavy pressure hold phase (as between times 21 and 23 in FIG. 1) with a one-solenoid PMV to the more even hold phase (between times 33 and 35 in FIG. 2) of a two-solenoid PMV. The graphs in FIGS. 3 and 4 show a single pressure control cycle of the several cycles as shown in FIG. 1, the electrical actuation of the one-solenoid PMV 37 and with the interrupted lines 45 and 47 indicating the brake application pressure as applied by the drivers operated brake valve. As described in FIG. 1 this one single pressure cycle consists of the three typical pressure modes: release during time T1, quasi hold during time T2 and interrupted built up during time T3. To get the quasi pressure hold and the interrupted built up steps with a one-solenoid PMV, the special pulsation-mode by varying the one-solenoid PMV duty cycle and/or frequency according the invention is effective during T2, and T3. The ratio of the time during which the valve 37 is enabled releasing pressure to the time during which the valve is disabled may be varied by changing the duration of the enabling pulses, by changing the repetition rate of fixed duration enabling pulses, or by combinations of these or other techniques. The valve is alternately enabled and disabled to hold pressure substantially constant as during T2 and subsequently alternately enabled and disabled at a reduced ratio of enabled duration to disabled duration to rebuild braking pressure as during T3. Consideration of the fundamental behavior of the pressure gradient dependency on the pressure level due to pressure release and built up is desirable.

Due to the physical behavior of compressed air, the pressure gradient (pressure change per time unit) is steep when pressure built up starts from a lower to a higher pressure level and less steep when pressure comes close to the drivers applied application pressure. The behavior is opposite during pressure release, that is, steep gradient by release from a higher-pressure level and less steep when pressures reach lower level. One of the methods to get information about the pressure level is to monitor the release time T1. FIG. 3 indicates an ABS event on an icy or slippery road. Due to the lower friction of the road surface, the brake chamber pressure is released at a relatively low level to prevent wheel lock-up. In this case, the pressure gradient is steep during built up and flat during release. T1 is relatively long. FIG. 4 indicates an ABS event on a high friction surface, such as dry asphalt. The higher friction allows the brake chamber pressure to reach a relatively high level before the wheels will lock-up. The pressure gradient in this case is steep during release and less steep during built up of pressure. T1 is comparatively shorter. Dependent on this pressure gradient behavior and brake pressure levels on different road surfaces, the release time, T1, will be longer on slippery roads and shorter on high friction roads.

With this physical fact, the logic behind the variation of duty cycles and/or frequency to operate a one-solenoid PMV in a quasi pressure hold mode in an ABS event is as follows: The variation of the duty cycles and/or frequency depends on the pressure release time T1. Longer release time T1, activates a duty cycle with a shorter de-energize phase td (solenoid in build up mode) and a longer energized phase te, (solenoid in release mode) as seen in FIG. 3. Shorter release time T1, activates a duty cycle with a longer de-energize phase td and shorter energize phase te as seen in FIG. 4. The change of the energize- and de-energize phases of the duty cycles can also be achieved by variation of the duty cycle frequency. By holding constant the time td, a higher frequency will shorten the time te and lower frequency will lengthen the time te. Similarly, by holding constant the time te, a higher frequency will shorten the time td and lower frequency will lengthen the time td. In the faster build, slower decay situation of FIG. 3, as indicated by a larger value of T1, the ratio of de-energized to energized time is lower than in the slower build, faster decay situation of FIG. 4. Also a combination of duty cycle changes and frequency changes are possible. The actual times te and td and also the right frequency are based mainly on test results.

The variation of the duty cycles and/or frequency can be dependent also to the respective brake pressure level in the ABS event with an actual pressure level in an ABS event calculated by the ECU with an ECU internal stored pressure calculation model. The model considers the physically behavior of compressed air when released and subsequently rebuilt including the dependence of the pressure gradient to the pressure level and also the operating characteristic of the one solenoid controlled valve. The ECU internal pressure calculation model is only active during the ABS event and starts always with the first release cycle, in FIG. 1 time 15 from a pressure level half of the maximal possible brake pressure level, which is normally the tank pressure level. From this first release cycle on with each single pulse of the electrical actuated one solenoid valve an time-adequate pressure level will be subtracted when in release mode and added when in build up mode. To start with the first estimated pressure level half of the maximum level is a compromise to find the right pressure level because no information of the actual pressure level is available before the first valve duty cycle is activated. This approximation method allows a relative accurate estimation of the instantaneous pressure level during an ABS event. The ratio of de-energized to energized time of the one solenoid duty cycles is based on the calculated pressure level in the same way as the dependence to the release time T1. When a lower pressure level is calculated, equal to a longer release time T1, duty cycles are activated with shorter de-energized phases td and longer energized phase te. A higher-pressure level, equal to a shorter release time T1, activates duty cycles with longer de-energize phase td and shorter energize phases te. The basic logic and parameters of this ECU internal pressure calculation model is mainly recruited with simulated tests.

The graph in FIG. 5 shows a single pressure control cycle of the several cycles in FIG. 1, but here the explanation is focused on the interrupted pressure build up phase T3. The advantage of an interrupted pressure build up was explained in discussing FIG. 1. With a two-solenoid PMV the interrupted pressure built up consists of pressure built up and hold phases as seen in FIG. 2. With a one-solenoid PMV the hold phase (horizontal portions of the stair step in FIG. 2) are replaced by a short release phase.

Figure 7:
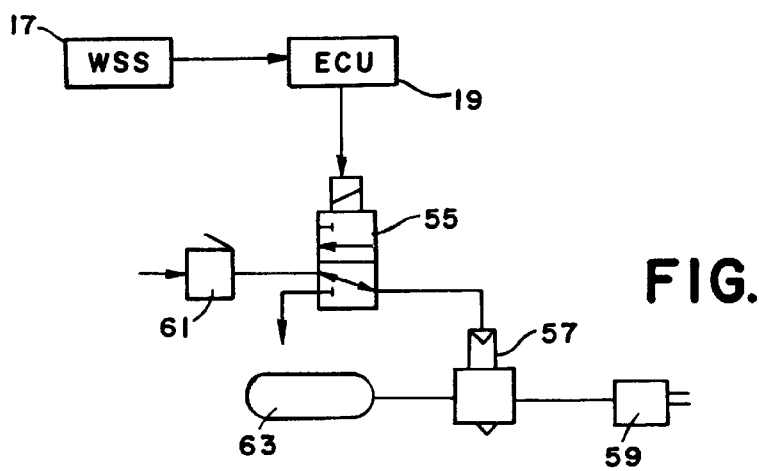
FIG. 7 is a schematic diagram of an alternate arrangement of a one-solenoid valve in a pneumatically operated brake system.

The braking systems of FIGS. 6 and 7 illustrate two preferred embodiments of the present invention, however, the techniques may be applied to other pressure escape or control valve applications. In FIG. 6, only one brake circuit (one wheel) is shown. It includes a driver operated brake valve 49 in connection with the ECU 19 controlled one-solenoid valve 37 which is coupled to the brake chamber or cylinder 51. During normal braking, solenoid 37 remains de-energized and in the position shown to supply normal braking pressure as commanded by the driver operated brake valve 49. Upon sensing a braking situation calling for ABS, the ECU 19 selectively energizes and de-energizes solenoid 37 to bleed fluid through outlet 53 and resupply pressure by way of line 54. The arrow to the brake valve 49 represents a connection to a compressed air tank. The build pressure is provided from the supply pressure of the air tank and delivered to the brake chamber 51 from the brake valve 49. The one-solenoid PMV 37 is in a de-energized position and there is an unhindered passage from the brake valve to the brake chamber. During normal braking, the brake valve 49 also provides the release of the brake chamber pressure by releasing the brake chamber pressure to the atmosphere. In an ABS event the brake chamber pressure is regulated by the one-solenoid PMV 37 by electrical commands provided by the ECU 19.

In FIG. 7, a relay valve 57 is used to pressurize and depressurize the brake chamber 59 at a faster rate, so that the brake response is accelerated. Such a solenoid controlled relay valve would mainly be used in an Antilock Brake System (ABS) for air braked trailers. FIG. 7 shows an arrangement of the one-solenoid valve 55 in conjunction with a relay valve 57. On application of the brake valve 61, the relay valve 57 speeds delivery of air from the reservoir 63 to the brake chamber 59 by bypassing the brake valve 61. On release, air pressure in the brake chamber 59 is vented at the relay valve 57. Since the relay valve is located closer to the brake chamber (or chambers) than the brake valve, it applies and releases the brakes more quickly. The operating principle of the relay valve is to actuate a great quantity of compressed air in a larger diameter air line from a compressed air reservoir (supply line) to the brake chambers (delivery line) with a small and therefore highly mobile quantity of compressed air with a low diameter air line (control line).

In a normal brake event the relay valve 57 delivers or releases brake chamber pressure in direct proportional to the signal air. According to the driver's demand by actuating the brake pedal, the brake valve 61 delivers only the control air in a smaller volume to the relay valve 57. Proportional to this control air the relay valve 57 takes the larger volume of brake chamber pressure directly from the reservoir 63 to the brake chamber 59. The release of the brake chamber pressure is also proportional to the control air, but vented directly from the relay valve 57 to the atmosphere. The one-solenoid PMV 55 is connected only in the control line. In the normal braking mode the solenoid is in a de-energized position and the control air goes unhindered to the control port of the relay valve. In an ABS event the control air from the brake valve 61 to the relay valve 57 is regulated by the one-solenoid PMV 55 and by the operating principle of the relay valve also the brake chamber pressure is regulated.

Figure 8:
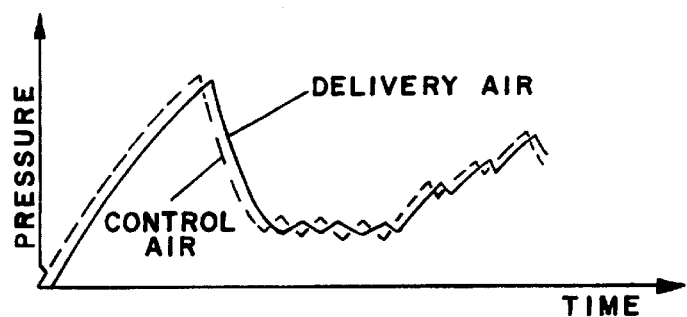
FIG. 8 is a graph showing the behavior of the control pressure to the delivery pressure of a one-solenoid operated relay valve in conjunction with the special control mode.

Due to the hysteresis of the control input to the delivery output of a relay valve, the rapidly pulsed pressure decrease and build up steps are only visible to the control pressure making such systems excellent candidates for the control mode of the one-solenoid valve. The behavior of the delivery pressure is, in principle, exact the same as a two-solenoid controlled relay valve. As shown in FIG. 8, the control air (dotted line) of a relay valve is always a bit quicker in response time than the delivery air (solid line). This phenomenon is named pressure hysteresis and caused mainly by the friction of the internal relay piston and relay inlet valve. Due to the delay of the delivery pressure, the accuracy to control a certain pressure level is limited. The pressure hysteresis also increases the reaction time of the delivery pressures when starting the hold, built up or release phases. With the pulsated quasi pressure hold with the one-solenoid operated relay valve, the disadvantages of the pressure hysteresis are nearly eliminated. With the first contra pulse of the control pressure when delivery should start holding, the hysteresis stops the pressure decrease immediately. The same is true with the interrupted pressure built up. Due to the contra pulses after the build up steps, the quasi hold mode is reached faster. As a positive effect of the pressure hysteresis, the level of the pressure hold phase is filtered and more even than with an interrupter valve as described in conjunction with FIG. 6.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. In a process of operating a vehicle braking system where vehicle motion and wheel motion are monitored to determine when to invoke an antilock braking mode in a brake system wherein an operational fluid having a first high pressure is presented to effect a brake application, said operational fluid having a first steep pressure gradient that transitions into a first gradual pressure gradient as fluid pressure build up starts from a first lower pressure and approaches a second pressure level of a source of fluid, said antilock braking mode being invoked when a predetermined difference occurs between said vehicle motion and said wheel motion such that said first high pressure is released from said brake system to attenuate such difference, said operational fluid having a second steep pressure gradient when first high fluid pressure is initially released from the system and approaches a lower second pressure fluid level wherein said vehicle motion and said wheel motion are essentially equal, process including the steps of:

enabling a single-solenoid valve to release said operational fluid from said brake system and reduce said first high fluid pressure to said lower second fluid pressure to effect said antilock braking mode;

monitoring the fluid pressure release time $T_1$ for the first high fluid pressure to go to said second lower fluid pressure level;

alternately enabling and disabling duty cycles for said single solenoid valve to maintain said lower second fluid pressure at a substantially constant reduced pressure until wheel motion is greater that said vehicle motion, said duty cycles having an energized time $t_e$ and a de-energized time $t_d$ wherein a ratio of energized time $t_e$ to de-energized time $t_d$ is a function of said first high fluid pressure of the operational fluid and the release time $T_1$ for the operational fluid to go from said first high fluid pressure and said lower second fluid pressure, said duty cycles having an initial cycle wherein said low second fluid pressure is approximately one half of said high first fluid pressure to define an initial release time $T_1$ such that when a lower fluid pressure than said lower second fluid pressure is required to achieve continuity between said vehicle and wheel motion a longer release time $T_1$ occurs and as a result said duty cycles thereafter are initiated with a shorter de-energized time $t_d$ and a longer energized time $t_e$ and when a higher fluid pressure than said lower second fluid pressure is required to achieve continuity between said vehicle and wheel motion a shorter release time $T_1$ occurs and as a result said duty cycles thereafter are initiated with a longer de-energized time $t_d$ and a shorter energized time $t_e$; and subsequently enabling said single solenoid valve to rebuild operational fluid pressure by changing the ratio of the energized time $t_e$ during which the valve to the de-energized time $t_d$ during which said single solenoid valve is disabled to rebuild fluid pressure in said operational fluid to a second operational fluid level until a sensed condition indicated a second difference occurs between said wheel and vehicle motion.

2. The process of claim 1 wherein the ratio of the energized time $t_e$ during which the valve is enabled to the de-energized time $t_d$ time during which the valve is disabled increases as the time $T_1$ during which the single-solenoid valve was enabled to release said first fluid pressure increases.

3. The process of claim 2 wherein the ratio of the energized time $t_e$ during which the valve is enabled to the de-energized time $t_d$ time during which the valve is disabled is varied by varying the time duration of the single-solenoid valve enabling signal.

4. The process of claim 1 wherein the vehicle braking system includes an air actuated braking device, an operator control for commanding the supply of air to the braking device, a pneumatically controlled relay valve for selectively supplying air from the source to the braking device, and said single solenoid valve supplies control air pressure from the operator control to the relay valve.

5. The process of claim 4 wherein the relay valve is:

enabled by the single-solenoid valve to release said first fluid pressure from said brake system;

alternately enabled and disabled by the single solenoid valve to maintain second fluid pressure at a substantially constant reduced pressure; and subsequently enabled and disabled by the single solenoid valve at a reduced ratio of enabled duration to disabled duration to rebuild braking pressure.

* * * * *